(12) United States Patent
Augustine et al.

(10) Patent No.: US 11,320,888 B2
(45) Date of Patent: May 3, 2022

(54) ALL-DIGITAL CLOSED LOOP VOLTAGE GENERATOR

(71) Applicant: Intel Corporation, Santa Clara, CA (US)

(72) Inventors: Charles Augustine, Portland, OR (US); Muhammad Khellah, Tigard, OR (US); Arvind Raman, Austin, TX (US); Ashish Choubal, Austin, TX (US); Karthik Subramanian, Austin, TX (US); Abdullah Afzal, Austin, TX (US); Feroze Merchant, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 109 days.

(21) Appl. No.: 16/124,071

(22) Filed: Sep. 6, 2018

(65) Prior Publication Data

US 2020/0081512 A1   Mar. 12, 2020

(51) Int. Cl.
| | |
|---|---|
| *G06F 1/00* | (2006.01) |
| *G06F 1/3234* | (2019.01) |
| *H02M 3/157* | (2006.01) |
| *G06F 1/324* | (2019.01) |
| *H02M 1/00* | (2006.01) |

(52) U.S. Cl.
CPC .............. *G06F 1/325* (2013.01); *G06F 1/324* (2013.01); *H02M 3/157* (2013.01); *H02M 1/0012* (2021.05)

(58) Field of Classification Search
CPC ....................................................... G06F 1/325
See application file for complete search history.

(56) References Cited

U.S. PATENT DOCUMENTS

| | | | |
|---|---|---|---|
| 7,162,652 B2 | 1/2007 | Issa et al. | |
| 10,161,995 B2* | 12/2018 | Krystad | ............. G01R 31/2875 |
| 2008/0224753 A1* | 9/2008 | Tsuji | .......................... G06F 1/04 |
| | | | 327/292 |
| 2008/0231328 A1* | 9/2008 | Leydier | ..................... G06F 1/04 |
| | | | 327/105 |

(Continued)

FOREIGN PATENT DOCUMENTS

EP           1505480           2/2005

OTHER PUBLICATIONS

Nasir, Saad B. et al., "All-Digital Low-Dropout Regulator with Adaptive Control and Reduced Dynamic Stability for Digital Load Circuits", IEEE Transactions on Power Electronics, vol. 31, No. 12, Dec. 2016, 10 pgs.

(Continued)

*Primary Examiner* — Mohammed H Rehman
(74) *Attorney, Agent, or Firm* — Schwabe, Williamson & Wyatt, P.C.

(57) ABSTRACT

An apparatus is provided which comprises: a plurality of devices coupled to an input power supply rail and an output power supply rail; a first circuitry coupled to the plurality of devices, wherein the first circuitry is to turn on or off one or more devices of the plurality according to a control; and a second circuitry coupled to the first circuitry, wherein the second circuitry comprises an all-digital proportional-derivative mechanism to generate the control according to a digital representation of voltage on the output power supply rail.

25 Claims, 10 Drawing Sheets

(56) References Cited

U.S. PATENT DOCUMENTS

| | | | |
|---|---|---|---|
| 2010/0223487 A1* | 9/2010 | Foerster | G01R 13/0254 |
| | | | 713/500 |
| 2014/0237284 A1* | 8/2014 | Fine | G06F 21/00 |
| | | | 713/340 |
| 2015/0200541 A1 | 7/2015 | Gorla et al. | |
| 2016/0179180 A1 | 6/2016 | Gupta et al. | |
| 2016/0342185 A1 | 11/2016 | Rodriguez et al. | |
| 2017/0257079 A1 | 9/2017 | Jain et al. | |
| 2018/0233911 A1* | 8/2018 | Rosendahl | H02J 3/18 |

OTHER PUBLICATIONS

Salem, Loai G. et al., "A Successive Approximation Recursive Digital Low-Dropout Voltage Regulator with PD Compensation and Sub-LSB Duty Control", IEEE Journal of Solid-State Circuits, vol. 53, No. 1, Jan. 2018, 15 pgs.
International Search Report and Written Opinion from PCT/US2019/039058 dated Oct. 8, 2019, 15 pgs.
International Preliminary Report on Patentability from PCT/US2019/039058 dated Mar. 18, 2021, 12 pgs.

* cited by examiner

| Corner | Current (mA) | Temp. (C) | Vin 1.15V | Vin 0.75 V |
|---|---|---|---|---|
| Slow | 0.147 | 30 | 1 | 1 |
| Typ. | 0.414 | 30 | 1 | 2 |
| Fast | 4.31 | 30 | 3 | 9 |
| Slow | 0.383 | 70 | 1 | 2 |
| Typ. | 1.76 | 70 | 2 | 5 |
| Fast | 18.04 | 70 | 10 | 35 |
| Slow | 1.13 | 110 | 2 | 5 |
| Typ. | 7.02 | 110 | 5 | 19 |
| Fast | 60.0 | 110 | 34 | 54 |

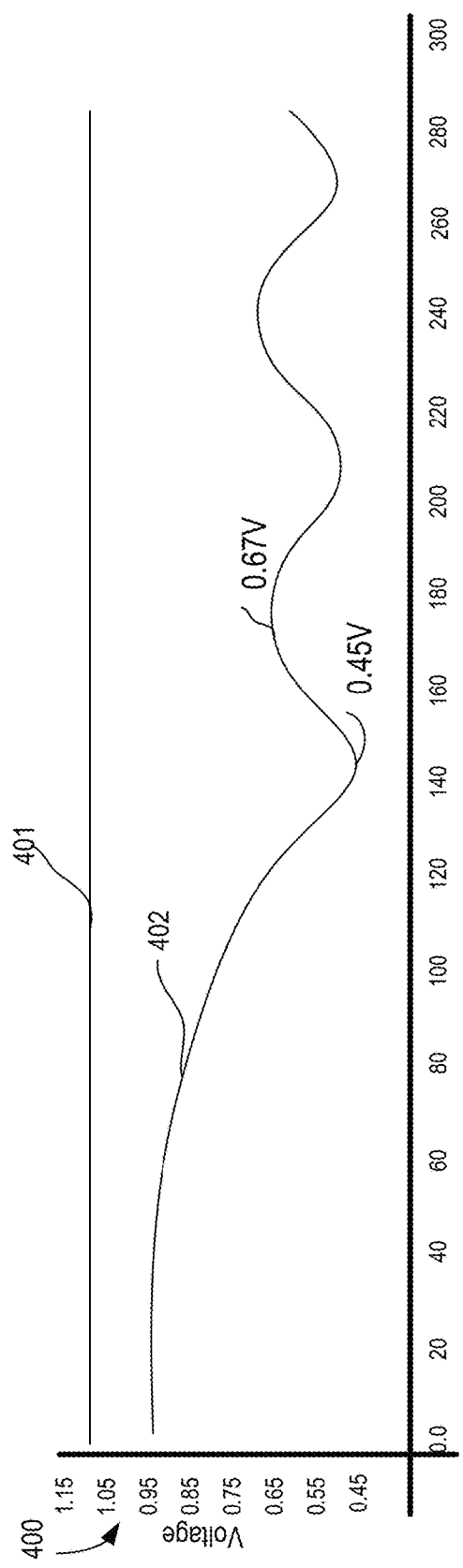

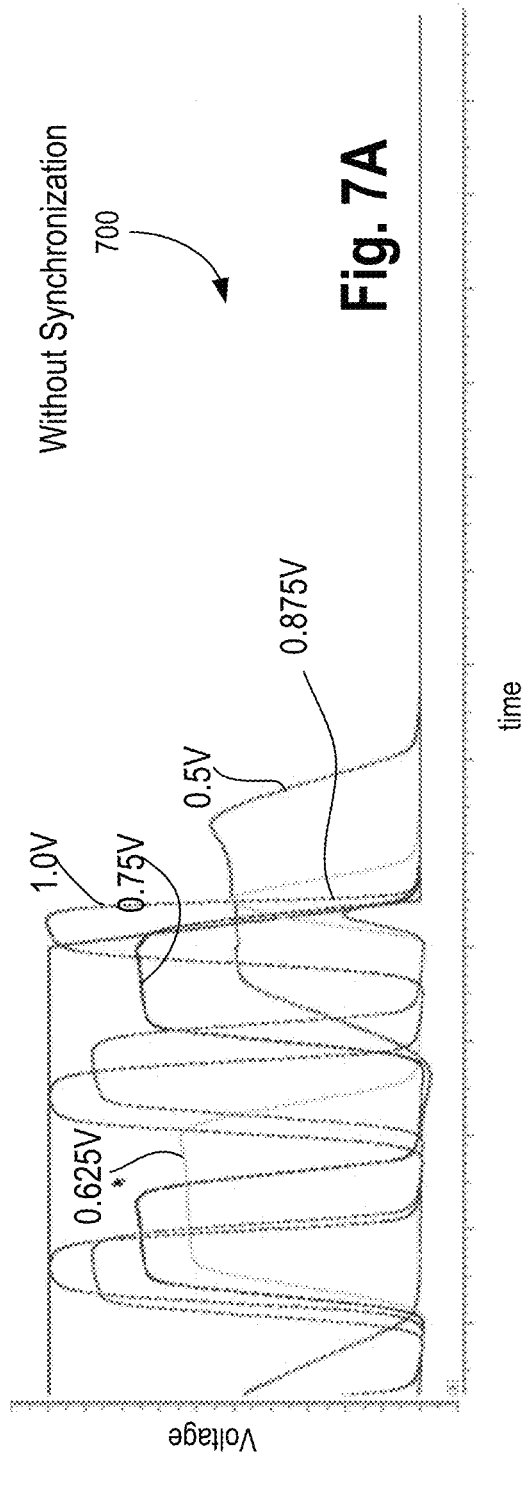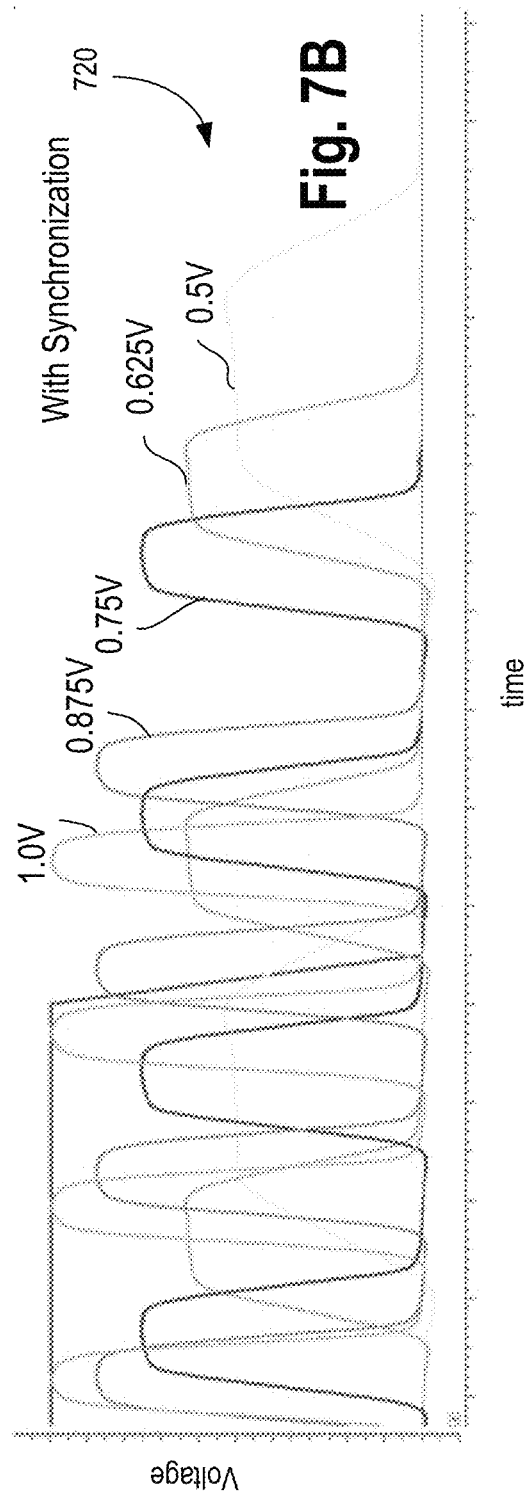

ALL-DIGITAL CLOSED LOOP VOLTAGE GENERATOR

BACKGROUND

Modern processing cores or processors have multiple power states to lower their power consumption when they are idle or stalled (e.g., low power state). The Advanced Configuration and Power Interface (ACPI) provides a standard for software (e.g., operating systems) to perform power management. Processor power states in the ACPI are defined as C-states, and include C0, C1, C2, C3, and onwards. C0 is the operating state or active state of a processor or processor core. C1 is a first level low power state of a processor or processor core and is also known as the Halt state. In C1, a processor or processor core is not executing instructions, but is expected to return to an executing state essentially instantaneously. In one example, in the low-power state C1, the processor core clock is gated to save dynamic capacitance, Cdyn. The C1 power state has very short entry ($T_{entry}$) and exit-time (or $T_{exit}$) as well as small break even time (BET), defined as minimum time needed to stay in the C1 state to start saving power to amortize the energy spent entering and exiting the state. The small BET of the C1 state is due to the low energy overhead of entering into the state paying only for the clock gating/ungating Cdyn cost. However, C1 may not allow for leakage power savings—making it best choice for short stall periods. On the other hand, ultra-low power saving state, such as the C6 state, virtually eliminates leakage power in addition to clock Cdyn. However, the C6 state comes at a higher $T_{entry}$ and $T_{exit}$, due to the time needed to copy and restore the processor core state, respectively, as well as higher BET due to energy overhead of entering and leaving the power state. This makes C6 the better choice for very long idle periods to amortize its large energy overhead.

It is a challenge for existing power supply generators and/or regulators to provide stable and fast power adjustment to the power supply output while ensuring stable operation across a very wide leakage load current range and when input power supply changes during transitions between various power states etc.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIGS. 4A-B illustrate plots comparing ripples on the output voltage from the LDO of FIG. 1 compared to the apparatus of FIG. 3, in accordance with some embodiments.

FIGS. 7A-B illustrate plots showing the effects of the absence and presence of the synchronizer logic, in accordance with some embodiments.

DETAILED DESCRIPTION

Figure 1:
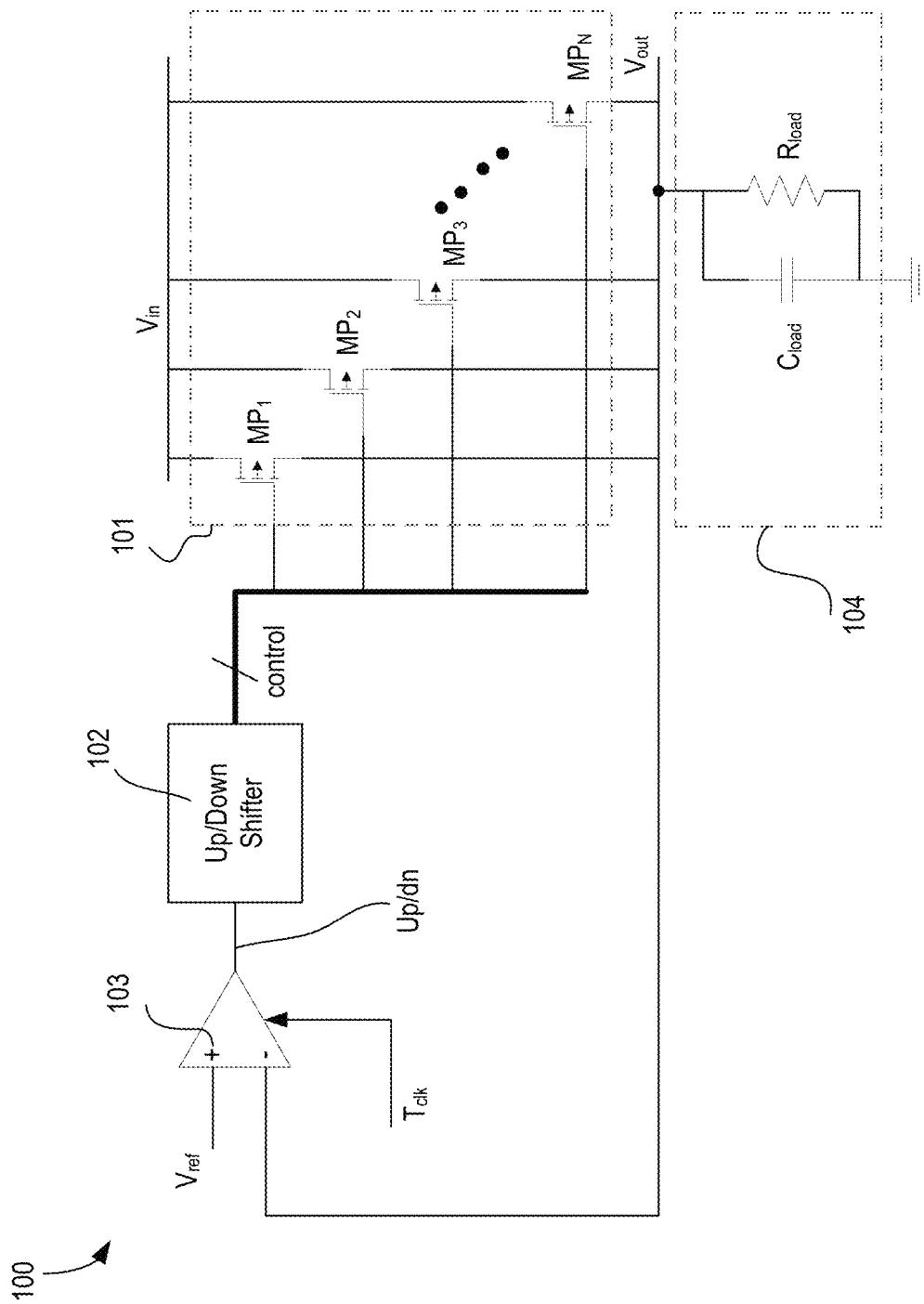
FIG. 1 illustrates a mixed signal low dropout (LDO) regulator.

For intermediate idle periods, some embodiments use a new power state, called C1LP state, with much faster $T_{exit}$ than the C6 power state and much better power savings compared to the C1 power state. The apparatus of some embodiments use a leakage power reduction feature and in-situ state retention using a closed loop global retention clamp. In some embodiments, the apparatus comprises: a plurality of devices (e.g., power gates) coupled to an input power supply rail ($V_{in}$) and an output power supply rail ($V_{out}$). The output power supply rail is used to provide power to one or more loads (e.g., processor core, cache, etc.). During a low power state, the voltage on the output power supply rail is reduced. During the low power mode, the voltage to the input power supply may also be reduced. In some embodiments, the apparatus comprises a first circuitry (e.g., up/down shifter) coupled to the plurality of devices, wherein the first circuitry is to turn on or off one or more devices of the plurality according to a control. This control is adjusted according to the loading conditions and/or the power saving state. In some embodiments, the apparatus comprises: a second circuitry (e.g., proportional-derivative (PD) circuit) coupled to the first circuitry, wherein the second circuitry comprises an all-digital PD mechanism to generate the control according to a digital representation of voltage on the output power supply rail.

There are many technical effects of the various embodiments. For example, the all-digital closed loop apparatus with PD control scheme maintains the processor core at retention voltage while ensuring stable operation across: 1) a very wide leakage load current range due to process, temperature, voltage (PVT) and aging variations, 2) input supply voltage $V_{in}$ changes due to dynamic voltage and frequency scaling events, 3) output decoupling capacitor range, and 4) controller sampling clock frequency. The apparatus of various embodiments allows for a faster or shorter exit time compared to the exit time associated with higher power states such as the C6 state. For example, the $T_{exit}$ using the apparatus is about 100 nanoseconds (ns) which is 37 times to 100 times faster than known C6 $T_{exit}$ times depending on operating processor core frequency.

The apparatus of some embodiments also results in a faster BET than traditional apparatuses. For example, the BET using the apparatus is in a range of about 6 to 43 microseconds (μs) which is 4 times to 1.04 times faster than the BET achieved for C6 states. The leakage power using the various embodiments is lower than what is achieved using the C1 state. For example, the leakage power for the new power state using the apparatus of various embodiments is about 91 milli-Watt (mW) to 57 mw, which is 3.8 times to 1.04 times less than the leakage power in the C1 state. Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level. The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top." "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described, but are not limited to such.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

FIG. 1 illustrates a mixed signal low dropout (LDO) regulator 100. The LDO regulator 100 comprises a plurality of power gate transistors 101 coupled to an input power supply rail $V_{in}$ (which is to provide input power $V_{in}$) and an output power supply rail $V_{out}$ (which is to provide an output power supply $V_{out}$). Here, 'N' power gate transistors are shown as transistors $MP_1$ through $MP_N$ that are operable to be turned on or off by a digital control. The digital control may be a bus or a codeword that indicates which transistors to turn on. In some embodiments, the power gate transistors $MP_1$ through $MP_N$ are binary weighted. In some embodiments, the power gate transistors $MP_1$ through $MP_N$ are thermometer weighted. The plurality of power gate transistors 101 are driven by an up/down shifter 102 that increments or decrements the value of the control codeword. In a traditional LDO, the up/down shifter 102 is instructed to shift the codeword up or down in value according to an output of a comparator 103. The comparator 103 may be a clocked comparator that compares an analog reference $V_{ref}$ with the analog voltage $V_{out}$ every $T_{clk}$ cycle. The output of the comparator 103 is an error e(t) which varies with time and is updated every $T_{clk}$ cycle.

With various power saving modes, LDO 100 is expected to provide a stable output power supply on the rail $V_{out}$ for different input power supply voltage levels on $V_{in}$, and also for different $V_{ref}$ values. Further, the load 104 may change its current loading requirements for different power modes, and the LDO 100 is expected to provide little to no ripple on the output power supply rail $V_{out}$ during loading condition changes. Here, the load is represented as capacitor $C_{load}$ and resistor $R_{load}$ in parallel to the capacitor $C_{load}$. The load 104 can be any suitable load such a processor core, cache, IO (input-output) circuitries, etc.

The LDO regulator 100, however, has a limited $V_{out}$ range (e.g., $V_{out}$ is approx. equal to $V_{RETENTION}$) and light leakage-based load current target that can vary exponentially across process, voltage, and temperature (PVT) and aging. Here, $V_{RETENTION}$ is the minimum voltage provided on the output power supply rail $V_{out}$ that allows various circuitries and logic gates to remain operational without losing their state values. Under highly variable light load current situation, maintaining LDO stability (translated to low $V_{out}$ ripple) is a challenge.

One way to provide a stable LDO is using a mixed signal proportional-derivative (PD) control scheme which allows the loop integrator of LDO 100 to adapt its accumulation at a rate close to the output pole (which is a function of the load current at a given point in time) to avoid instability. However, converting the LDO 100 of FIG. 1 with a mixed signal proportional-derivative (PD) control scheme requires additional capacitors and careful design, which cause issues and challenges with scaling the circuit architecture to different technology nodes.

For LDO 100, comparator 103 samples $V_{out}$ and compares it to $V_{ref}$ every $T_{clk}$ period (where $V_{ref}=V_{RETENTION}$ for this particular retention case). At a given time (t), the loop integrator is incremented or decremented based on the error $e(t)=V_{out}-V_{ref}$ as follows: If e(t) less than 0 then increment loop integrator and increase power-gate strength; Else if e(t) is greater than 0 then decrement loop integrator and decrease power-gate strength. During steady state, the minimum error of LDO 100 is 1 LSB (least significant bit). To maintain loop stability under all cases the following condition is to be satisfied:

$$T_{clk} > T_{PATH} + K * T_{LOAD}$$

where $T_{PATH}$ is the total latency from comparator 103 to the power-gates 101, and $T_{LOAD}$ is approximately $R_{load}C_{load}$ and represents the inverse of the output pole which is a function of both the load current (represented by $R_{LOAD}$) and decoupling cap ($C_{load}$). In other words, $T_{clk}$ needs to be set at a rate lower than the rate of change of $V_{out}$ to allow $V_{out}$ to settle before taking the next increment/decrement decision. Under a leakage current load scenario (e.g. during retention) of a fast die and hot temperature (e.g., temperature greater than or near 100 degree Celsius), leakage current is high and so $R_{load}$ is small resulting is small $T_{LOAD}$ and so $T_{clk}$ needs to be relatively fast. The opposite is true for a slow die and cold temperature (e.g., temperatures near 0 degrees Celsius). These conflicting conditions on $T_{clk}$ makes it harder to maintain loop stability specially under exponentially varying load current due to process, temperature, or aging variations.

One possible method to deal with this dilemma is to adapt $T_{clk}$ based on sensing the load current, where the number of power gates turned on at a given time is used as an indication of the load current. If this number is above certain threshold, then $T_{clk}$ is made smaller (i.e., faster) and vice-versa. This scheme is not practical, however, under very wide load current range as explained with reference to FIG. 2.

Figure 2:
FIG. 2 illustrates a table showing a wide range of power gates that need to be enabled or disabled for the LDO of FIG. 1 to provide a particular low voltage supply output using two different input power supply levels.

FIG. 2 illustrates a table 200 showing the wide range of power gates that need to be enabled or disabled for the LDO of FIG. 1 to provide a particular low voltage supply output using two different input power supply levels. Table 200 shows leakage current for a typical processor core under $V_{out}=V_{RETENTION}=0.55V$ showing a substantially large difference in number of on power gates even for the same die process corner due to $V_{in}$ and temperature variations. In this example, when $V_{in}$ is 1.15V, the range of power gates is from 1 to 34, and when $V_{in}$ is 0.75V, the range of power gates is form 1 to 54. A look up table and extensive calibration may be needed for this scheme to work.

Figure 3:
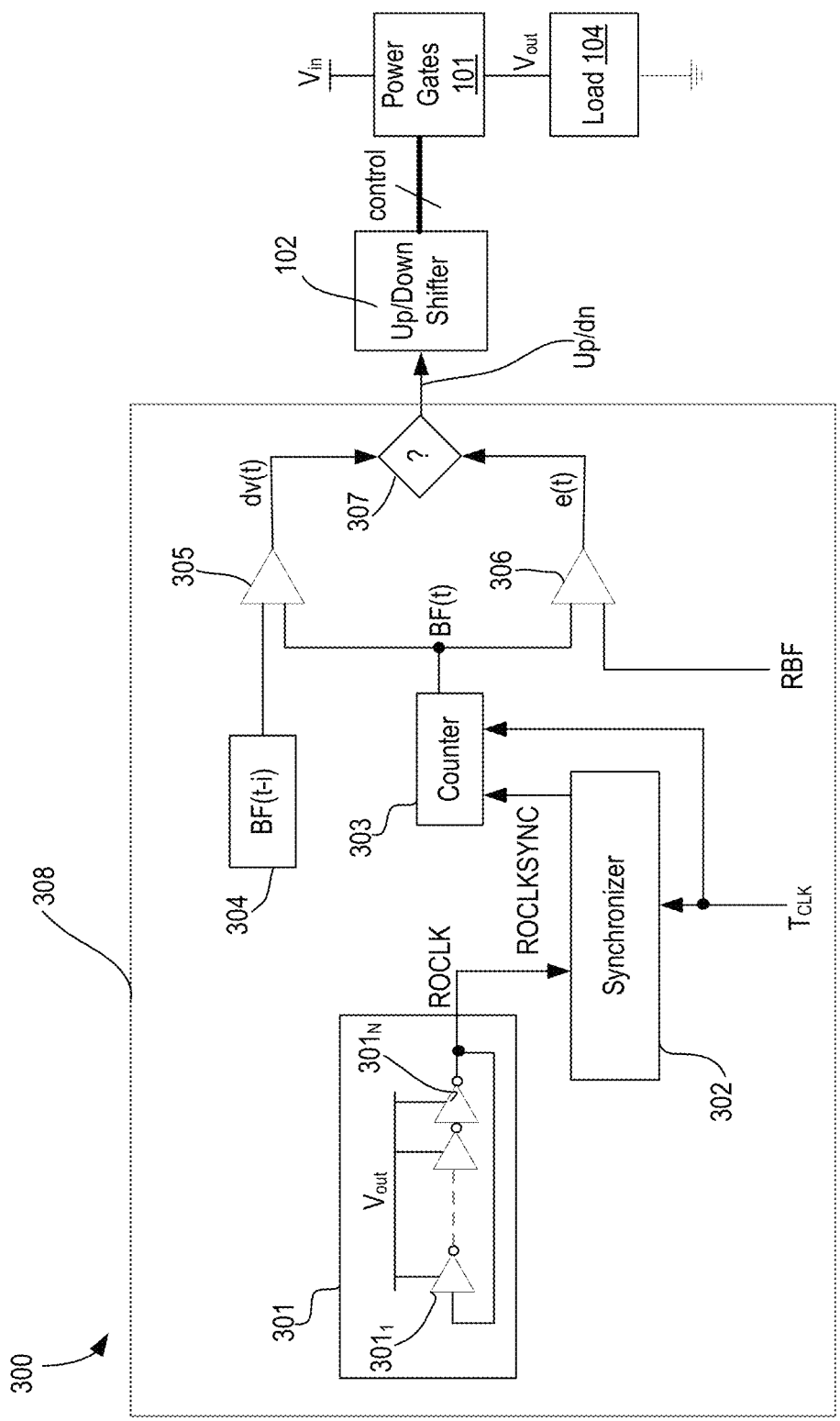
FIG. 3 illustrates an apparatus comprising an all-digital proportional derivative (PD) controller for a voltage supply generator, in accordance with some embodiments.

FIG. 3 illustrates apparatus 300 comprising an all-digital proportional derivative (PD) controller for a voltage supply generator, in accordance with some embodiments. In some embodiments, comparator 103 is replaced with an all-digital PD controller 308 which comprises: an oscillator 301, a synchronizer 302, a counter 303, a storage device 304 for storing a previous or past beat frequency, comparators 305 and 306 and logic 307. In some embodiments, oscillator 301 is a free running ring oscillator which is powered by the voltage provided by the output power supply rail $V_{out}$. In this example, N number of inverters ($301_{1-N}$) are coupled together in a ring formation. The embodiments are not limited to this specific ring oscillator style. Any suitable oscillator powered by $V_{out}$ can be used to generate ROCLK. ROCLK may be unrelated to $T_{clk}$, which is used by counter 303. For example, $T_{clk}$ may be generated by a phase locked loop (PLL). As such, in some embodiments, synchronizer 302 is used to synchronize the two clocks—$T_{clk}$ and ROCLK—and generate a synchronized version of the ROCLK called ROCLKSYNC.

In some embodiments, apparatus 300 finds the beat frequency BF(t) of the free-running oscillator 301 (also referred to RO sensor 301) every $T_{clk}$ cycle during retention. BF(t) is found by counting the number of RO cycles in one $T_{clk}$. In various embodiments, a binary counter 303 is used for counting the number of RO cycles from the ROCLKSYNC signal. Any suitable counter can be used for implementing counter 303. The BF(t) is then compared with a reference beat frequency (RBF) by comparator 306. The comparison results in an error signal e(t). Any suitable low power comparator may be used for implementing comparator 306. Here, the RFB may be found per die (or per a population of dies) during class test when running the RO sensor 301 at $V_{RETENTION}$ condition (e.g., at hot conditions). In some embodiments, RFB is a programmable value that can be adjusted using software (e.g., operating system) or hardware (e.g., fuses). In some embodiments, RBF is stored in a non-volatile memory (NVM). In various embodiments, PD controller 308 also includes comparator 305 to compare BF(t) with a previous or past BF(t) value (e.g., BF(t−i)). The output of comparator 306 indicates a slope or derivative dv(t) of the BF. The previous value may be the immediate previous value or some past value that can indicate a trend in the beat frequency.

The loop integrator (which comprises the power gates 101) is incremented, decremented, or remains unchanged by logic 307 based on 1) the current error defined as e(t)=BF(t)−RBF, and 2) derivative of $V_{OUT}$ defined as dv(t)=BF(t)−BF(t−i), where i≥1 and BF(t−i) is the BF stored as a digital code of the RO in cycle t−i, as follows:

If [e(t)<0) AND (dv(t)≤0] then increment loop integrator
Else if [e(t)>0) AND (dv(t)≥0] then decrement loop integrator
Else loop integrator remains unchanged The integrator is incremented when $V_{out}$ is less than $V_{RETENTION}$ (the proportional term) while at the same time $V_{out}$ also has a negative slope or a zero slope (derivative term). Similarly, the loop integrator is decremented when $V_{out}$ is larger than $V_{RETENTION}$, while at the same time $V_{out}$ is also trending upward with a positive slope, or when $V_{out}$ stays constant with zero slope. Otherwise, the loop integrator value is kept unchanged.

With the apparatus of some embodiments, $T_{clk}$ is set independent of 1) load current variation due to process/temperature/aging, 2) decoupling capacitor, and 3) input supply voltage $V_{in}$. In some cases, $T_{clk}$ can be set to the lowest possible delay (e.g., greater than $T_{PATH}$) with the highest possible frequency while PD controller 308 automatically allows the loop integrator to adapt its accumulation at a rate close to the output pole to avoid instability. Setting $T_{clk}$ to the lowest possible (e.g., greater than $T_{PATH}$) can be useful for fast response to a voltage droop for a more general use scenario of controller 308 where the load current can exhibit fast di/dt event (a case that may not happen during retention).

FIGS. 4A-B illustrate plots 400 and 420, respectively, comparing ripples on the output voltage from the LDO 100 of FIG. 1 compared to the apparatus 300 of FIG. 3, in accordance with some embodiments. In this simulation example, $V_{in}$ is 1.1V illustrated by identifier 401 and $T_{clk}$ is 400 MHz, and the target $V_{out}$ is 0.55V. Here, $V_{out}$ is illustrated by 402 for FIG. 4A, and 422 for FIG. 4B. The average voltage ripple is dramatically reduced from 110 mV for apparatus 100 to 25 mV for apparatus 300.

To further illustrate the benefits of apparatus 300, Table 1 is illustrated.

TABLE 1

| | FIG. 1 | FIG. 3 | FIG. 1 | FIG. 3 | FIG. 1 | FIG. 3 |
|---|---|---|---|---|---|---|
| Frequency (MHz) | 100 | 100 | 200 | 200 | 400 | 400 |
| Temp. (C.) | 70 | 70 | 70 | 70 | 70 | 70 |
| Average Ripple (mV) | 75 | 40 | 85 | 40 | 110 | 25 |
| Settling Time (ns) | 500 | 1250 | 260 | 540 | 150 | 220 |

Here, the apparatus of FIG. 1 and FIG. 3 are simulated using the fast corner and high temperature condition (e.g., 70 C), $V_{in}$ of 1.1V, target $V_{out}$ of 0.55V, and three $T_{clk}$ operating values of 100 MHz, 200 MHz, and 400 MHz. In the apparatus of FIG. 1, there is no history of data to compare with. In that case, with decrease in frequency from 400 MHz to 100 MHz, voltage ripple improves from 110 mV to 75 mV and response (or settling) time gets worse from 150 ns to 1250 ns. In the apparatus of FIG. 3, frequency can be kept higher (e.g., 400 MHz) thus having fastest response time of 220 ns and at the same time achieve smallest ripple possible of 25 mV.

Table 2 shows the temperature dependency of apparatus 100 and 300 under fast process corner, frequency of 400 MHz, $V_{in}$ of 1.1V, target $V_{out}$ of 0.55V, and across three temperatures of 30 C, 70 C and 110 C.

TABLE 2

| | FIG. 1 | FIG. 3 | FIG. 1 | FIG. 3 | FIG. 1 | FIG. 3 |
|---|---|---|---|---|---|---|
| Frequency (MHz) | 400 | 400 | 400 | 400 | 400 | 400 |
| Temp. (C.) | 30 | 30 | 70 | 70 | 110 | 110 |
| Average Ripple (mV) | 70 | 35 | 110 | 25 | 25 | 20 |
| Settling Time (ns) | 150 | 235 | 150 | 220 | 65 | 105 |

As illustrated by Table 2, the scheme of apparatus 300 shows lower ripple across all temperatures compared to the scheme of apparatus 100.

Figure 5:
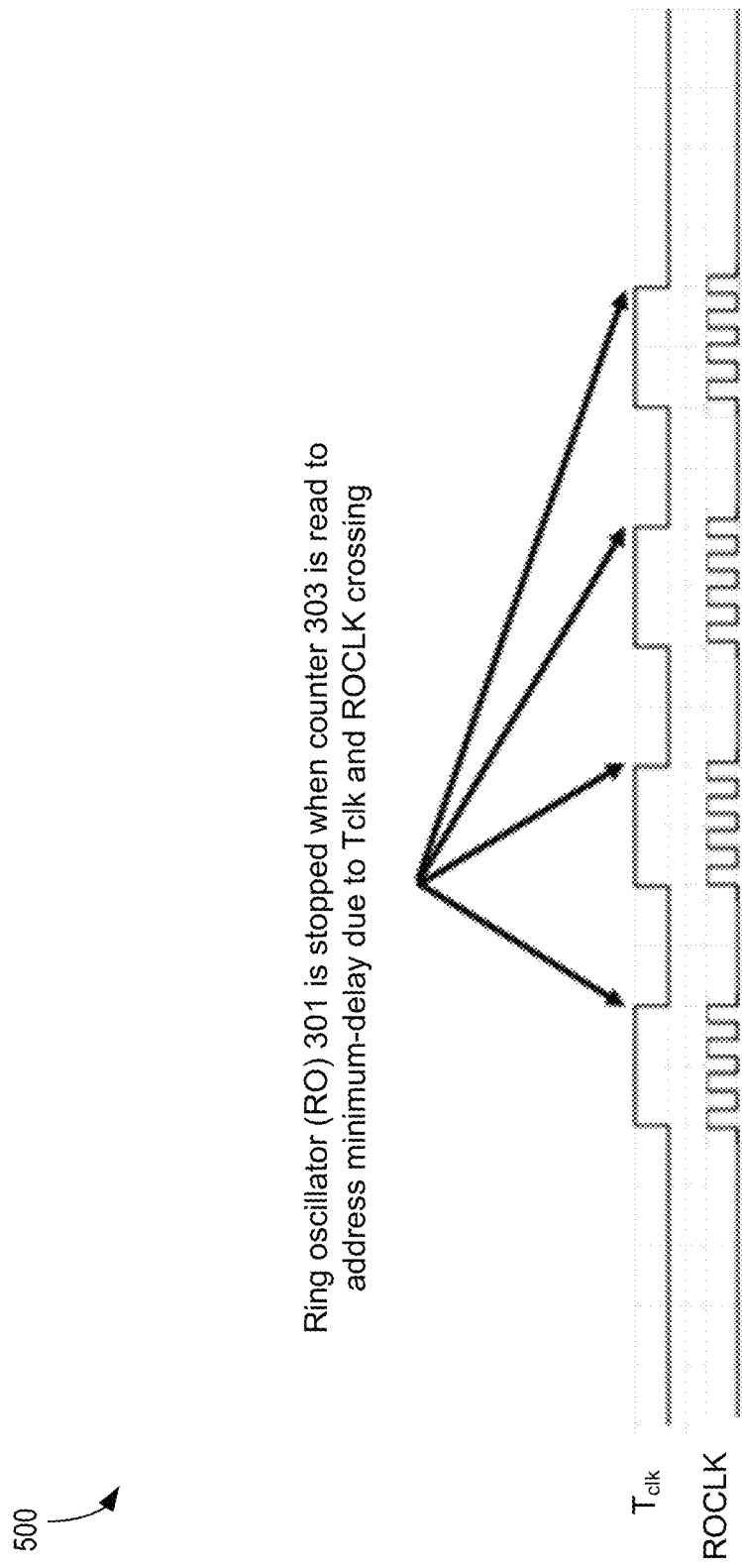
FIG. 5 illustrates a timing diagram of the clocks of the apparatus of FIG. 3, in accordance with some embodiments.

FIG. 5 illustrates a timing diagram 500 of the clocks of the apparatus of FIG. 3, in accordance with some embodiments. To address clock synchronization between the sampling clock, $T_{clk}$, which runs up to, for example, a few 100's MHz and the ring oscillator clock ROCLK running at multiples of GHz, ROCLK is activated during the positive phase of $T_{clk}$ and the counter output is sampled on the next positive edge of $T_{clk}$ as illustrated by the timing diagram 500. However, stopping ROCLK abruptly (e.g., asynchronously) may result in minimum delay (or hold time) failure in counter 303. To address this problem, in some embodiments, ROCLK is synchronized with $T_{CLK}$ before feeding the counter 303 using the synchronizer logic illustrated in FIG. 6.

Figure 6:
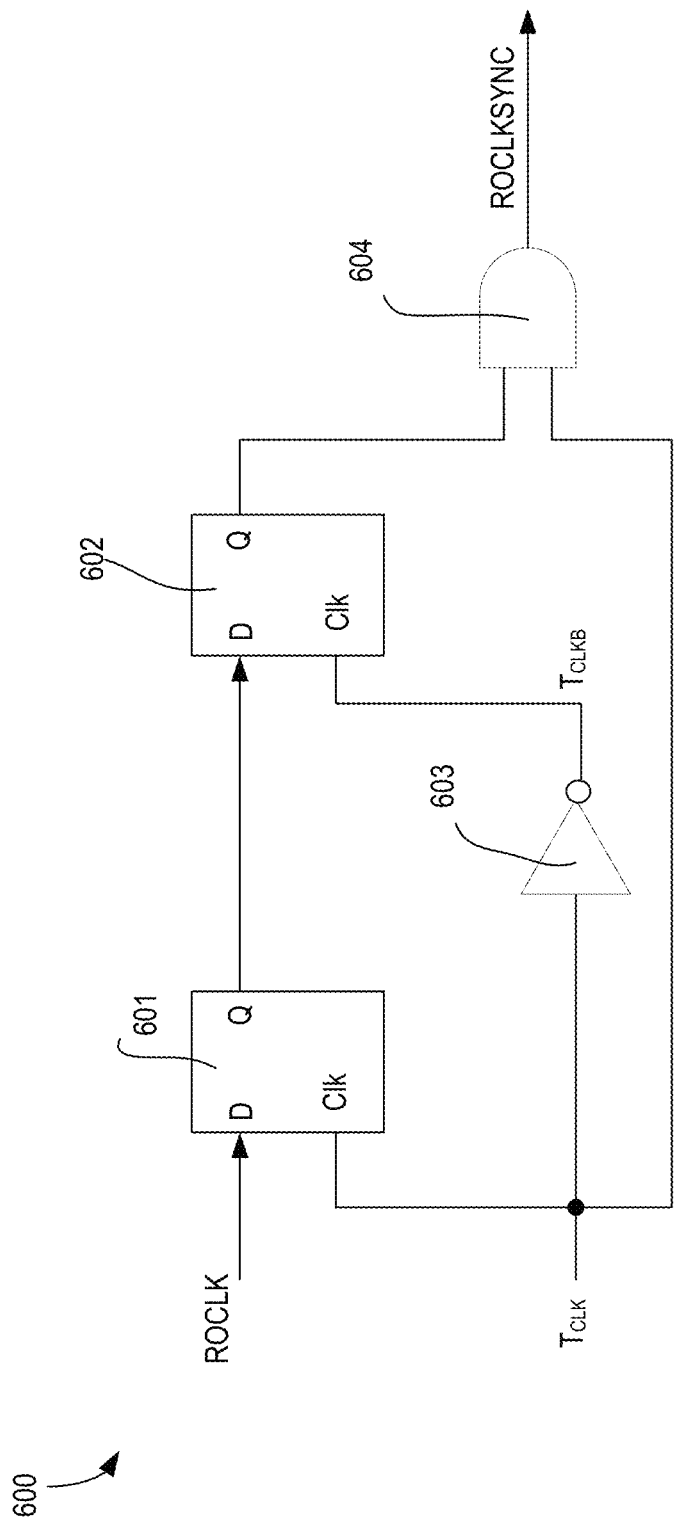
FIG. 6 illustrates a synchronizer logic between two clocks of the apparatus of FIG. 3, in accordance with some embodiments.

FIG. 6 illustrates a synchronizer logic 600 (e.g., 302) between two clocks of the apparatus of FIG. 3, in accordance with some embodiments. Logic 600 comprises flip-flops 601 and 602, inverter 603, and AND logic gate 604 coupled together as shown. ROCLK is received by flip-flop 601 at its data port (D) and sampled by $T_{clk}$. The inverted version of $T_{clk}$ is then used to sample the output Q of flip-flop 601 by flip-flop 602. The AND logic gate 604 then performs an AND logic function between $T_{clk}$ and the output Q of flip-flop 602. The output of AND logic gate 604 is ROCLKSYNC.

FIGS. 7A-B illustrate plots 700 and 720, respectively, showing the effects of the absence and presence of the synchronizer logic, in accordance with some embodiments. As it can be observed in FIG. 7B, ROCLK is not stopped abruptly when $T_{clk}$ is in the sampling (low) phase. As a result minimum-delay failure in counter 303 is avoided.

Figure 8:
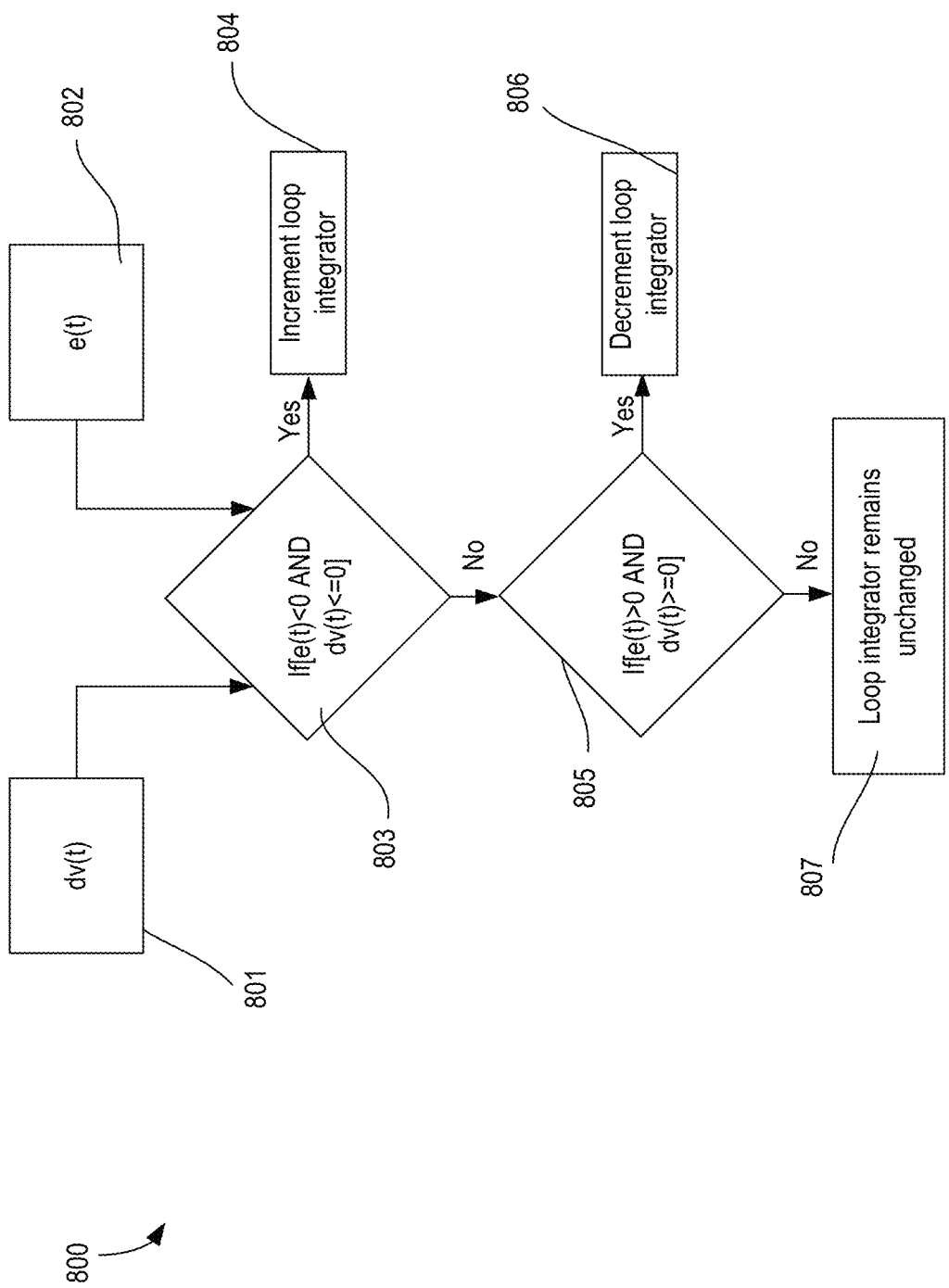
FIG. 8 illustrates a method for controlling power gates of the apparatus of FIG. 3, in accordance with some embodiments.

FIG. 8 illustrates a method flowchart 800 for controlling power gates of the apparatus of FIG. 3, in accordance with some embodiments. Some blocks of method flowchart 800 can be performed before others or simultaneously without changing the essence of the embodiments. At block 801, the slope or derivative dv(t) is determined. For example, dv(t) is generated by comparator 305 and provided to logic 307. At block 802, the error e(t) is determined. For example, error e(t) is generated by comparator 306 and provided to logic 307.

At block 803, logic 307 determines whether e(t) is less than zero and whether dv(t) less than or equal to 0. If both conditions are true, then loop integrator is incremented and the output Up is asserted for Up/Down shifter 102 as indicated by block 804. The Up/down shifter 102 then turns on an additional one or more power gate transistors.

At block 805, logic 307 determines whether e(t) is greater than zero and whether dv(t) is greater than or equal to 0. If both conditions are true, then loop integrator is decremented and the output down is asserted (or Up is de-asserted) for Up/Down shifter 102 as indicated by block 806. The Up/down shifter 102 then turns off an additional one or more power gate transistors 101. If the conditions of blocks 803 and 805 are not met, then logic 307 proceeds to block 807 where it maintains the previous setting for Up/Down signal and the number of power gates that are on and off remain the same. The process then repeats itself back from blocks 801 and 802.

In some embodiments, the operations by logic 307 can be performed by software. Program software code/instructions associated with flowchart 800 (and/or various embodiments) and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with flowchart 800 (and/or various embodiments) are executed by a processor or logic.

In some embodiments, the program software code/instructions associated with flowchart 800 (and/or various embodiments) are stored in a computer executable storage medium and executed by a processor (or processor core). Here, computer executable storage medium is a tangible machine readable medium that can be used to store program software code/instructions and data that, when executed by a computing device, causes one or more processors to perform a method(s) as may be recited in one or more accompanying claims directed to the disclosed subject matter.

The tangible machine readable medium may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer to peer networks and the like, including the Internet. Different portions of the software program code/instructions and data can be obtained at different times and in different communication sessions or in the same communication session.

The software program code/instructions (associated with flowchart 800 and other embodiments) and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible machine readable medium in entirety at a particular instance of time.

Examples of tangible computer-readable media include but are not limited to recordable and non-recordable type media such as volatile and non-volatile memory devices, read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical or other forms of propagating signals, such as carrier waves, infrared signals, digital signals, etc. through such tangible communication links.

In general, tangible machine readable medium includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, Blackberry® Droid®, or the like, or any other device including a computing device. In one embodiment, processor-based system is in a form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some embodiments of the disclosed subject matter.

Figure 9:
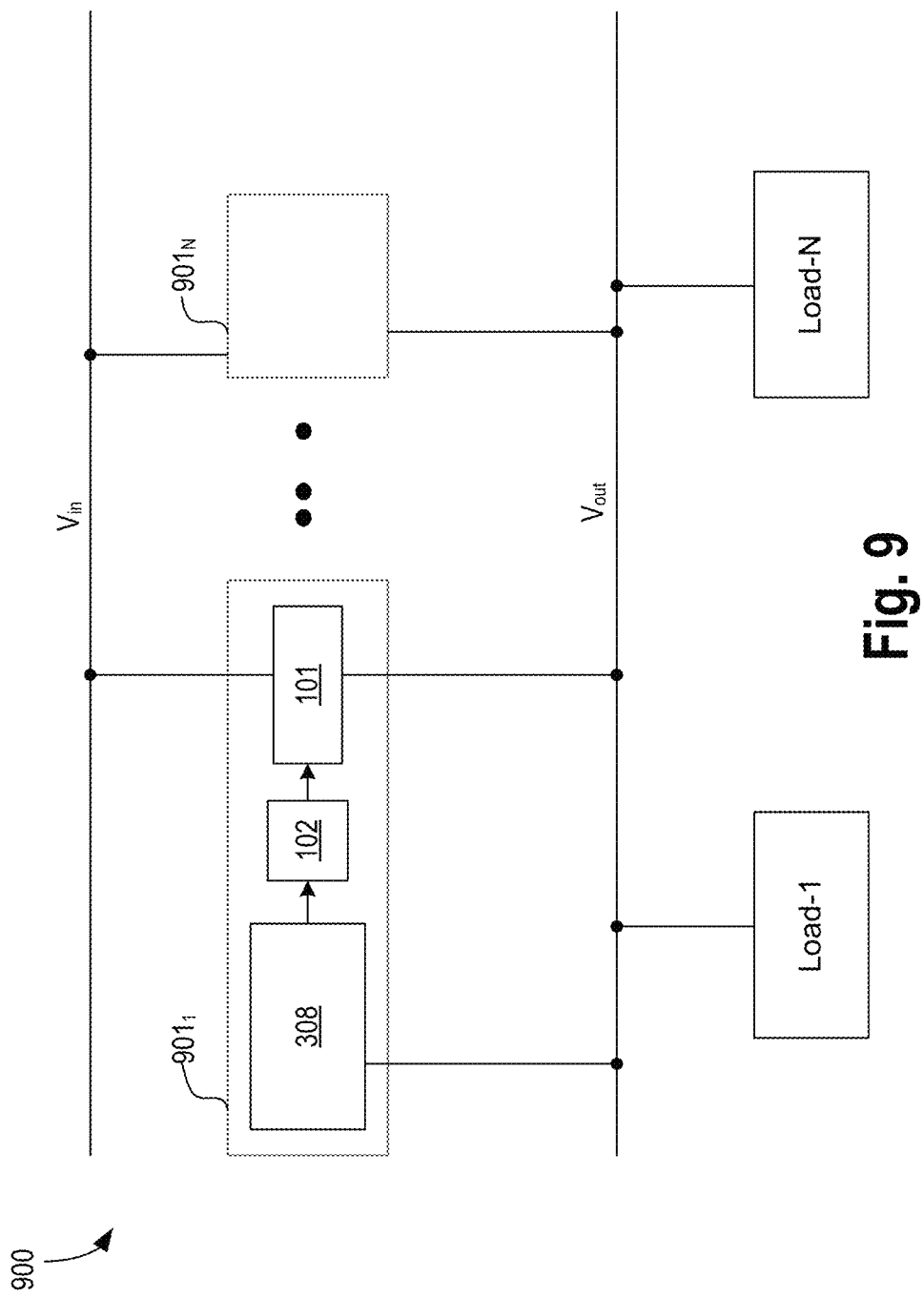
FIG. 9 illustrates a distributive network of apparatuses of FIG. 3 to provide regulated power supply to one or more loads, in accordance with some embodiments.

FIG. 9 illustrates a distributive network 900 of apparatuses of FIG. 3 to provide regulated power supply to one or more logic blocks, in accordance with some embodiments. In some embodiments, network 900 comprises 'N' number of distributed LDOs $901_{1-N}$ that are based on apparatus 300 of FIG. 3. These distributed LDOs can maintain various loading conditions on Load-1 through Load-N. While the embodiment of FIG. 9 illustrates separate PD controllers for each LDO, in some embodiments, PD controller 308 is shared among multiple LDOs. Even though the example of LDO shown with reference to various embodiments is for supplying leakage current during low-power state, the embodiments can also be used to supply dynamic current during active operation using the methodology of proportional-derivative control (PD). Moreover, due to all digital implementation, for larger power-domains, the PD LDO scheme can be replicated N times thus guaranteeing scalability of the design, in accordance with some embodiments. In some embodiments, the PD overhead is kept to a minimum so that replication can be achieved without significant area and/or power penalty.

Figure 10:
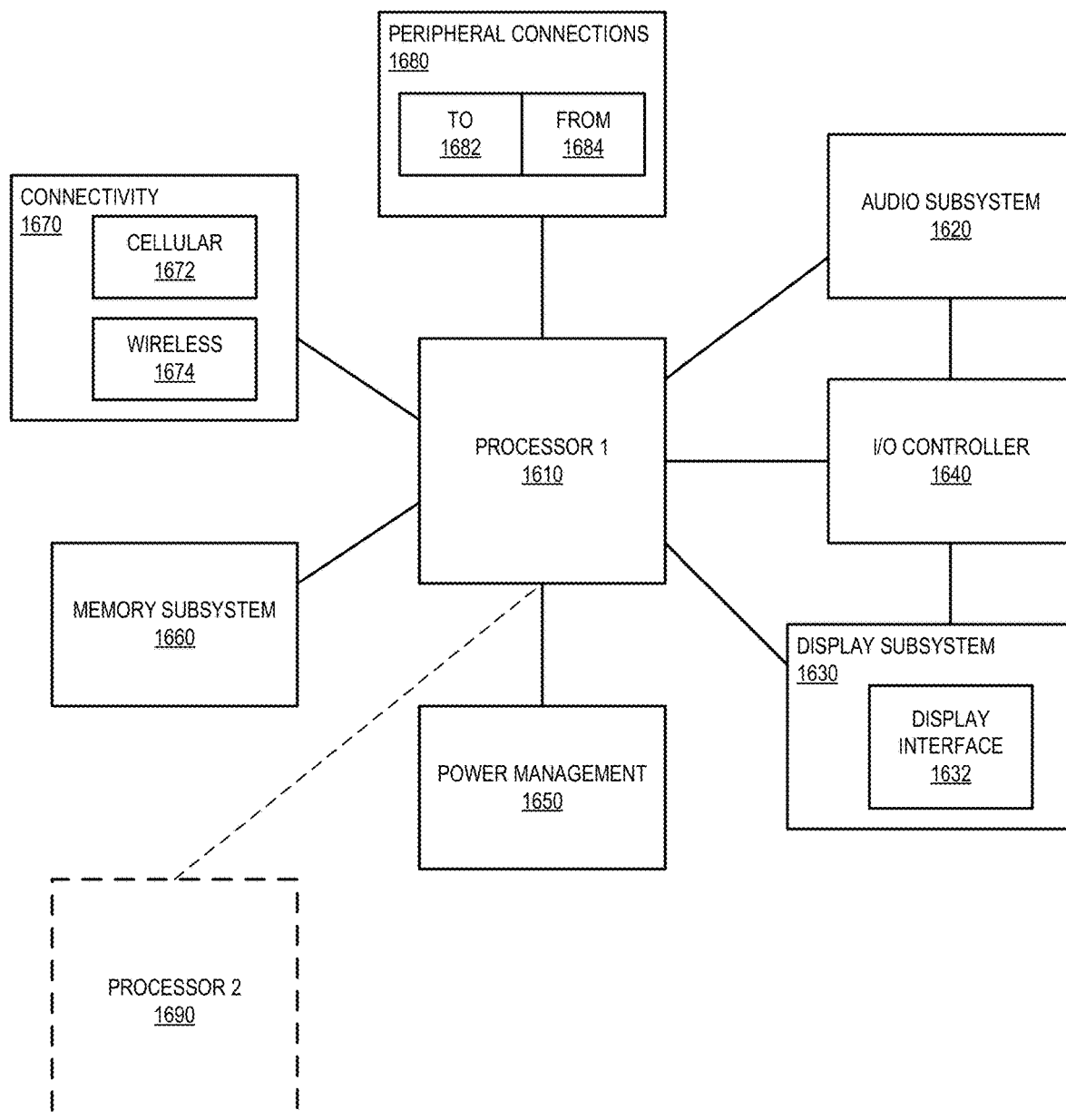
FIG. 10 illustrates a smart device or a computer system or a SoC (System-on-Chip) having an all-digital PD controller, according to some embodiments of the disclosure.

FIG. 10 illustrates a smart device or a computer system or a SoC (System-on-Chip) having an all-digital proportional derivative controller, according to some embodiments of the disclosure. In some embodiments, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In some embodiments, computing device 1600 includes first processor 1610 having one or more all-digital proportional derivative controllers, according to some embodiments discussed. Other blocks of the computing device 1600 may also include one or more all-digital proportional derivative controllers, according to some embodiments. The various embodiments of the present disclosure may also comprise a network interface within 1670 such as a wireless interface so that a system embodiment may be incorporated into a wireless device, for example, cell phone or personal digital assistant.

In some embodiments, processor 1610 (and/or processor 1690) can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In some embodiments, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

In some embodiments, computing device 1600 comprises display subsystem 1630. Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

In some embodiments, computing device 1600 comprises I/O controller 1640. I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In some embodiments, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In some embodiments, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, computing device 1600 comprises connectivity 1670. Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

In some embodiments, computing device 1600 comprises peripheral connections 1680. Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus comprising:
a plurality of power gate transistors coupled to an input power supply rail and an output power supply rail, the plurality of power gate transistors to provide an output power supply on the output power supply rail based on a number of the power gate transistors which are turned on;
a first circuitry coupled to the plurality of power gate transistors, wherein the first circuitry is to increment or decrement a value of a codeword and to turn on or off one or more power gate transistors of the plurality of power gate transistors based on the value of the codeword; and
a second circuitry coupled to the first circuitry, wherein the second circuitry comprises an all-digital proportional-derivative controller to generate an up or down instruction for the first circuitry according to a digital representation of voltage on the output power supply rail, the all-digital proportional-derivative controller includes an oscillator coupled to the output power supply rail, the oscillator is to generate a first clock which is synchronized by a second clock to generate a synchronized clock, and the second circuitry generates the up or down instruction based on a change in a frequency of the synchronized clock and an error of the frequency of the synchronized clock relative to a reference frequency.

2. The apparatus of claim 1, wherein the second circuitry comprises a counter to count a number of cycles in the synchronized clock in a clock cycle of the second clock to determine the frequency of the synchronized clock.

3. The apparatus of claim 2, wherein the second circuitry comprises a clock synchronizer to synchronize the first clock by the second clock_to generate the synchronized clock.

4. The apparatus of claim 1, wherein the second circuitry comprises a first comparator to compare a current value of the frequency of the synchronized clock with a past value of the synchronized clock to generate an output indicating the change in the frequency of the synchronized clock.

5. The apparatus of claim 4, wherein the second circuitry comprises a second comparator to compare the frequency of the synchronized clock with a reference frequency, to generate an output indicating the error of the frequency of the synchronized clock relative to the reference frequency.

6. The apparatus of claim 5, further comprising a logic to generate the up or down instruction according to the outputs of the first and second comparators.

7. The apparatus of claim 1, wherein:
the first circuitry comprises an up/down shifter;
the up/down shifter is to turn on one or more power gate transistors of the plurality of power gate transistors when the error is less than zero and the change in frequency is less than or equal to zero; and
the up/down shifter is to turn off one or more power gate transistors of the plurality of power gate transistors when the error is greater than zero and the change in frequency is greater than or equal to zero.

8. The apparatus of claim 1, wherein the plurality of power gate transistors comprises p-type transistors.

9. The apparatus of claim 1, wherein:
the first circuitry comprises an up/down shifter to increment or decrement the value of the codeword in response to the up or down instruction;
the up/down shifter is to increment the value of the codeword when the error is less than zero and the change in frequency is less than or equal to zero; and
the up/down shifter is to decrement the value of the codeword when the error is greater than zero and the change in frequency is greater than or equal to zero.

10. The apparatus of claim 1, wherein:
the reference frequency corresponds to the oscillator running at a VRETENTION condition; and
in the VRETENTION condition, a minimum voltage is provided on the output power supply rail that allows circuits and logic gates powered by the output power supply rail to remain operational without losing their state values.

11. An apparatus comprising:
a plurality of devices coupled to an input power supply rail and an output power supply rail, the plurality of devices to provide an output power supply on the output power supply rail;
a first circuitry coupled to the plurality of devices, wherein the first circuitry is to turn on or off one or more devices of the plurality of devices according to a control signal; and a second circuitry coupled to the first circuitry, wherein the second circuitry comprises an oscillator coupled to the output power supply rail, the oscillator is to generate a first clock, the first clock is synchronized by a second clock to generate a synchronized clock, the second circuitry is to determine an error in a frequency of the synchronized clock relative to a reference frequency and a change in the frequency of the synchronized clock, and the second circuitry is to generate the control signal to increase, decrease or maintain an output power supply of the plurality of devices based on the error and the change.

12. The apparatus of claim 11, wherein the second circuitry comprises a counter to determine the frequency of the synchronized clock.

13. The apparatus of claim 12, wherein the second circuitry comprises a clock synchronizer to synchronize the first clock with the second clock, and to generate the synchronized clock, the counter is to determine the frequency of the first clock via the synchronized clock, and the counter is to receive the second clock.

14. The apparatus of claim 11, wherein the second circuitry comprises:
a first comparator to compare a past frequency of the synchronized clock to a current frequency of the synchronized clock to generate an output indicating the change in the frequency of the synchronized clock; and
a second comparator to compare a reference frequency with the frequency of the synchronized to generate an output indicating the error.

15. The apparatus of claim 11, wherein:
the first circuitry comprises an up/down shifter;
the up/down shifter is to turn on one or more devices of the plurality of devices when the error is less than zero and the change in the frequency is less than or equal to zero;
the up/down shifter is to turn off one or more devices of the plurality of devices when the error is greater than zero and the change in the frequency is greater than or equal to zero; and
the up/down shifter is to maintain a number of turned on or off devices of the plurality when the error is greater than zero and the change in the frequency is less than zero, or when the error is less than zero and the change in the frequency is greater than zero.

16. A system comprising:
an up/down shifter coupled to a plurality of power gate transistors, wherein the plurality of power gate transistors are coupled to an input power supply rail and an output power supply rail and are to provide an output power supply on the output power supply rail based on a codeword output by the up/down shifter; and
proportional-derivative controller coupled to the output power supply rail, the proportional-derivative controller is to generate an up or down instruction for the up/down shifter according to a digital representation of voltage on the output power supply rail.

17. The system of claim 16, wherein voltage on the input power supply rail is adjusted for a power state.

18. The system of claim 16, wherein the proportional-derivative controller comprises an oscillator coupled to the output power supply rail, a clock synchronizer and a counter, the oscillator is to generate a first clock, the clock synchronizer is to synchronize the first clock with a second clock_to generate a synchronized clock, and the counter is to determine a beat frequency of the synchronized clock.

19. The system of claim 18, wherein the proportional-derivative controller comprises:
a first comparator to compare a current value of the beat frequency of the synchronized clock with a past value of the beat frequency of the synchronized clock, to generate an output indicating a change in the beat frequency of the synchronized clock;
a second comparator to compare the beat frequency of the synchronized clock with a reference beat frequency_ to generate an output indicating an error of the beat frequency of the synchronized clock relative to the reference beat frequency; and
logic to generate the up or down instruction according to the outputs of the first and second comparators.

20. The system of claim 19, wherein:
the up/down shifter is to turn on one or more power gate transistors of the plurality of power gate transistors when the error is less than zero and the change in the beat frequency is less than or equal to zero;
the up/down shifter is to turn off one or more power gate transistors of the plurality of power gate transistors when the error is greater than zero and the change in the beat frequency is greater than or equal to zero; and
the up/down shifter is to maintain a number of turned on or off power gate transistors of the plurality of power gate transistors when the error is greater than zero and the change in the beat frequency is less than zero, or when the error is less than zero and the change in the beat frequency is less than zero.

21. An apparatus comprising:
an oscillator;
an output power supply rail coupled to the oscillator, wherein the output power supply rail is to provide power to the oscillator, and the oscillator is to generate a first clock having a frequency based on a voltage on the output power supply rail; and
circuitry to synchronize the first clock from the oscillator by a second clock to generate a synchronized clock, to determine a change in a frequency of the synchronized clock and an error in the frequency of the synchronized clock relative to a reference frequency, and to control an output power supply on the output power supply rail based on the change and the error.

22. The apparatus of claim 21 further comprising a counter to determine the frequency of the synchronized clock.

23. The apparatus of claim 22 further comprising a first comparator to compare an output of the counter with a digital value indicating a past frequency count of the synchronized clock_to generate an output indicating the change in the frequency of the synchronized clock.

24. The apparatus of claim 23 further comprising a second comparator to compare the output of the counter with a reference frequency count_to generate an output indicating the error in the reference frequency of the synchronized clock relative to the reference frequency.

25. The apparatus of claim 24 further comprising:
logic to generate an up or down instruction for an up/down shifter to control the output power supply according to the outputs of the first and second comparators, wherein a plurality of power gate transistor are coupled to the output power supply rail, and the plurality of power gate transistors are controllable by an output of the up/down shifter.

* * * * *

UNITED STATES PATENT AND TRADEMARK OFFICE
CERTIFICATE OF CORRECTION

PATENT NO. : 11,320,888 B2
APPLICATION NO. : 16/124071
DATED : May 3, 2022
INVENTOR(S) : Muhammad Khellah et al.

It is certified that error appears in the above-identified patent and that said Letters Patent is hereby corrected as shown below:

In the Claims

Column 14
Line 14, "… clock_to generate" should read --clock to generate--
Line 26, "… comprising a logic to generate" should read --comprising logic to generate--

Column 15
Line 53, "… proportional-derivative controller" should read --… a proportional-derivative controller--
Line 64, "… clock_to generate" should read --… clock to generate--

Column 16
Line 9, "… frequency_ to generate" should read --… frequency to generate--
Line 44, "… claim 21 further" should read --… claim 21, further--
Line 48, "… claim 22 further" should read --… claim 22, further--
Line 51, "… clock_to generate" should read --… clock to generate--
Line 54, "… claim 23 further" should read --… claim 23, further--
Line 56, "… count_to generate" should read --… count to generate--
Line 59, "… claim 24 further" should read --… claim 24, further--

Signed and Sealed this
Eleventh Day of April, 2023

Katherine Kelly Vidal
*Director of the United States Patent and Trademark Office*